United States Patent Office.

CHARLES F. BONHACK, OF NEW YORK, N. Y.

FRICTION-MATCH.

SPECIFICATION forming part of Letters Patent No. 230,226, dated July 20, 1880.

Application filed April 6, 1880. (Specimens.)

*To all whom it may concern:*

Be it known that I, CHARLES F. BONHACK, a citizen of the United States, residing in New York city, in the State of New York, have invented certain new and useful Improvements relating to Friction-Matches, of which the following is a specification.

The invention is intended more especially for the class of goods known as "parlor-matches," which give off no offensive odor in combustion; but it can be applied with success also to the class of sulphur matches.

The invention lies in the composition for heading. It will serve on splints having any suitable dipping preparation previously applied.

I employ glue or Yucca starch, which, for this purpose, I consider an equivalent, with the advantages well known from the use of this material, and so combine it with the other ingredients that I produce a parlor-match which ignites and burns without any explosion.

My matches will endure all climates, and not ignite with any ordinary fall of a package. They will not ignite by being stepped upon. They are sure fire when subject to proper friction.

My invention avoids the necessity for chlorate of potash. My matches do not explode. The composition, when in mass, preparatory to dipping, is not liable to explosion. The temperature at which the dipping is conducted may be lower than usual, and less poisonous fumes are given off to injure the workmen.

My invention avoids the necessity for gum-arabic or any analogous gum. The matches can be more rapidly passed through all their several stages. They will afterward endure the warmest and moistest climates without softening.

The invention avoids the necessity for varnishing or coating. The manufacture can be conducted with a superior result at less expense than ordinary matches.

Take of powdered glass, flint, or pumice-stone, ten (10) pounds; niter or saltpeter, seven and a half (7½) pounds; glue, five (5) pounds; phosphorus, three and a quarter (3¼) pounds; crocus metallorum, three (3) pounds; and Venetian turpentine, four (4) ounces. Work these together with water, with the ordinary precautions, so that they will give the proper thin pasty consistency, with the temperature at about 90° Fahrenheit, at which it should be maintained during the dipping. This is spread in proper quantities in succession on the dipping-table, and the splints having been previously treated with paraffine, bees-wax, or other suitable fatty substance the dipping is conducted as usual.

I can, as above suggested, substitute Yucca starch for glue; and I can substitute the earthy material known as "Eureka paint" for the crocus metallorum.

For sulphur matches the process is conducted in all respects in the same way, except that the splints are previously treated with sulphur instead of any fatty substance.

My improved matches produce no appreciable mark on any surface on which they may be rubbed.

In consequence of the qualities before recited these matches can be stored in quantities, and can be transported by all kinds of conveyances with safety.

I claim as my invention—

1. The match-composition described, composed of niter, Venetian turpentine, phosphorus, glue, and the gritty and coloring materials, in the proportions substantially as herein specified.

2. A match consisting of a splint tipped with the herein-described composition of glue, phosphorus, niter, turpentine, powdered glass, and crocus metallorum, substantially as herein set forth.

In testimony whereof I have hereunto set my hand, at New York city, N. Y., in the presence of two subscribing witnesses.

CHAS. F. BONHACK.

Witnesses:
JOHN P. KAUS,
FREDERICK FOLZ.